US008292316B2

(12) United States Patent
Lin

(10) Patent No.: US 8,292,316 B2
(45) Date of Patent: Oct. 23, 2012

(54) ANGLE-ADJUSTING HEAD PARTS FOR FRONT FORK

(75) Inventor: Wen-Hwa Lin, Taichung (TW)

(73) Assignee: VP Components Co., Ltd., Taichung Hsien (TW)

( * ) Notice: Subject to any disclaimer, the term of this patent is extended or adjusted under 35 U.S.C. 154(b) by 202 days.

(21) Appl. No.: 12/969,915

(22) Filed: Dec. 16, 2010

(65) Prior Publication Data

US 2012/0153595 A1 Jun. 21, 2012

(51) Int. Cl.
*B62K 1/00* (2006.01)

(52) U.S. Cl. ........................................................ 280/280

(58) Field of Classification Search .................. 280/279, 280/280

See application file for complete search history.

(56) References Cited

U.S. PATENT DOCUMENTS

| | | | | |
|---|---|---|---|---|
| 3,866,946 | A * | 2/1975 | Robison | 280/279 |
| 6,783,158 | B2 * | 8/2004 | Nakagawa et al. | 280/785 |
| 7,793,958 | B2 * | 9/2010 | Lagar | 280/279 |
| 2006/0113745 | A1 * | 6/2006 | Lagar | 280/279 |
| 2008/0100028 | A1 * | 5/2008 | Mrdeza et al. | 280/280 |

* cited by examiner

*Primary Examiner* — Kevin Hurley
(74) *Attorney, Agent, or Firm* — WPAT, P.C.; Anthony King

(57) ABSTRACT

A set of angle-adjusting head parts includes upper and lower head parts respectively mounted on top and bottom ends of a bicycle's head tube holding a front fork stem. The upper head parts include an upper bearing cup having an axially extending oval slot and two retaining surfaces arranged parallelly with the major axis of the oval slot at laterals, an upper bearing having an eccentric slot for receiving the front fork stem and an eccentric seat for engaging into the oval slot, and an adjusting washer mounted in the upper bearing cup and movable along the minor axis of the oval slot and having a circular opening for receiving the upper bearing. Rotating the upper bearing forces the eccentric seat to stop against the retaining surfaces and synchronously move the adjusting washer along the major axis of the oval slot, thereby biasing the angle of the front fork stem.

8 Claims, 5 Drawing Sheets

ANGLE-ADJUSTING HEAD PARTS FOR FRONT FORK

BACKGROUND OF THE INVENTION

1. Field of the Invention

The present invention relates to head parts for front fork and more particularly, to an angle-adjusting head parts for front fork that allows adjustment to change the wheel span subject to the condition of the road and the rider's requirements.

2. Description of the Related Art

The head tube of a bicycle is connected with the front fork stem and the handlebar stem by means of a set of head parts. Because the angle of the front fork stem is determined subject to the angle of the head tube, the front fork stem can simply be rotated relative to the head tube subject to the arrangement of the upper and lower bearings in the head parts. To an ordinary bicycle rider, it is not necessary to adjust the angle of the front fork stem. However, to a bicycle racer who may need to race on different racing roads of different road conditions, riding controllability and stability are critical.

However, the riding controllability and stability and the steering ability are determined subject to the wheel span and the angle of the front fork stem. Shortening the wheel span relatively increases the sensitivity of riding controllability to fit for a road segment having multiple turns. Extending the wheel span increases the sensitivity of riding stability to fit for high-speed long straight riding. The wheel spans of regular bicycle frames are properly designed to keep the sensitivity and the stability in balance. However, regular bicycles do not allow adjustment of the angle of the front fork stem and the wheel span to fit different requirements of different riders.

SUMMARY OF THE INVENTION

The present invention has been accomplished under the circumstances in view. It is one object of the present invention to provide an angle-adjusting head parts for front fork that allows adjustment to change the wheel span subject to the condition of the road and the rider's requirements.

To achieve this and other objects of the present invention, an angle-adjusting head parts for front fork comprises a set of upper head parts and a set of lower head parts respectively mounted on top and bottom ends of a bicycle's head tube that holds a front fork stem that supports a handlebar stem. The set of upper head parts comprises an upper bearing cup, which comprises an axially extending oval slot, which has a major axis and a minor axis, an arched surface, and two retaining surfaces respectively located on two opposite inside lateral walls thereof in a parallel manner relative to the major axis of the oval slot, an upper bearing, which is mounted in the upper bearing cup, comprising a top rim, and an eccentric slot surrounded by the top rim for the insertion of the front fork stem and reducing gradually downwardly from the top rim and terminating in an eccentric seat that is adapted for engaging into the oval slot of the upper bearing cup for stopping against the retaining surface, and an adjusting washer, which is mounted in the upper bearing cup and movable relative to the upper bearing cup along the minor axis of the oval slot, having a circular opening defined therein and adapted for attaching to the upper bearing for enabling the upper bearing to be rotatably received in the adjusting washer. Rotating the upper bearing forces the eccentric seat to stop against the retaining surfaces and to further synchronously move the adjusting washer along the major axis of the oval slot, thereby correcting the position of the central axis of the eccentric slot and biasing the angle of the front fork stem.

Subject to matching between the retaining surfaces and the eccentric seat, displacement of the upper bearing along the minor axis of the oval slot is prohibited during movement of the adjusting washer to correct the position of the axial center of the eccentric slot, and therefore the upper bearing can only be moved along the major axis of the oval slot to the axial center of the upper bearing cup. Thus, by means of adjusting the angle of the front fork stem, the rider can adjust the wheel span of the bicycle subject to the condition of the road and personal requirements.

Further, the axle bearing of the set of upper head parts and the axle bearing of the set of lower head parts are external bearings respectively defining therein an oblique cone surface for allowing biasing of the front fork stem along the surface of the oblique cones of the axle bearings.

Subject to the aforesaid arrangement, fine-adjustment of the angle of the front fork stem is easy and labor-saving and can be done by means of rotating the upper bearing.

Further, the actual angle error of the head tube can be accurately corrected by means of adjusting the angle of the front fork stem, assuring best wheel span of the bicycle.

DETAILED DESCRIPTION OF THE PREFERRED EMBODIMENT

The spirit and scope of the invention will be fully understood by way of embodiments by reference to the following specification in conjunction with the annexed drawings, in which every component part is illustrated subject to a proper proportion, size, amount of deformation or amount of displacement, and like reference signs denote like elements of structure.

Figure 1:
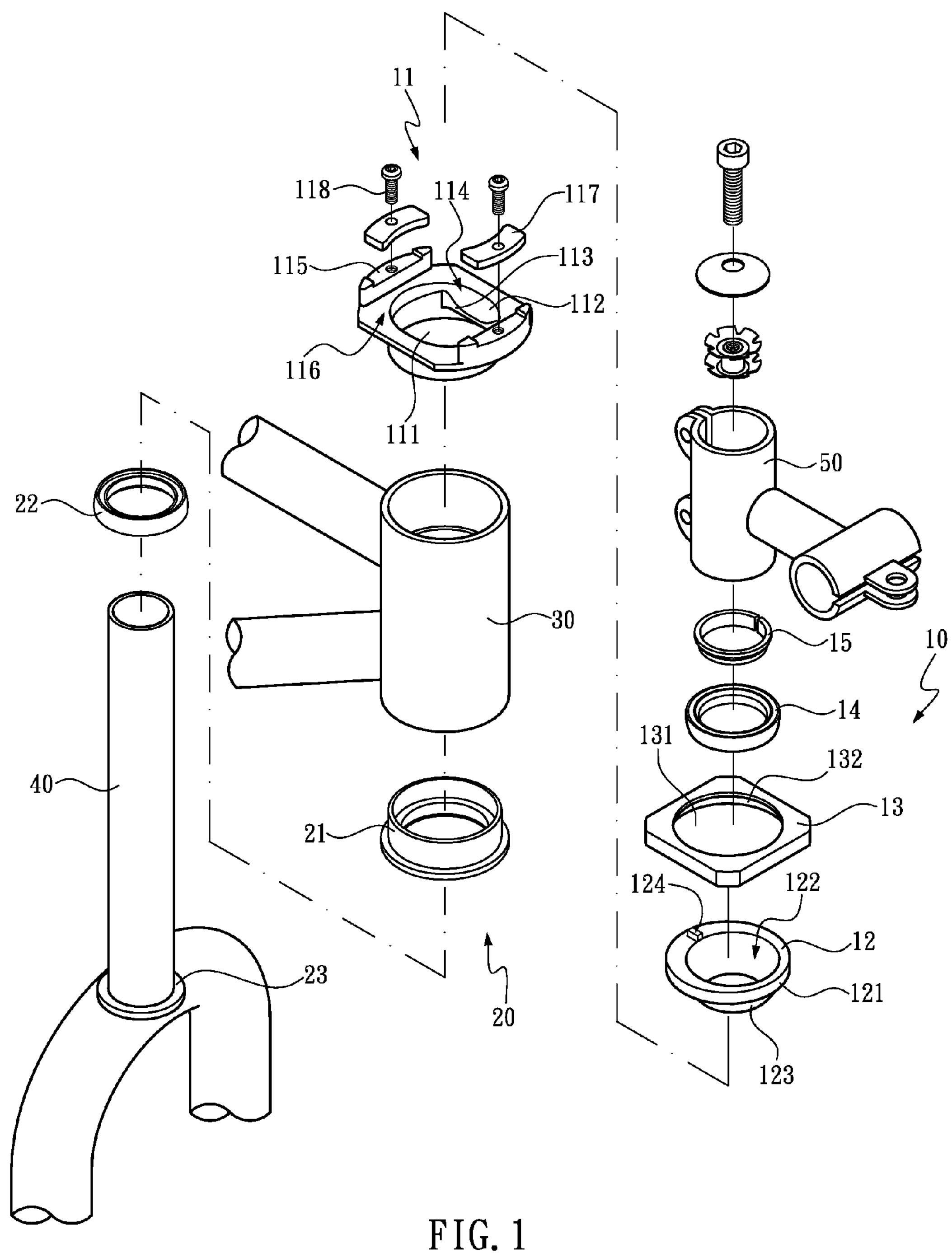
FIG. 1 is an exploded view of a set of angle-adjusting head parts for front fork in accordance with the present invention.
Figure 2:
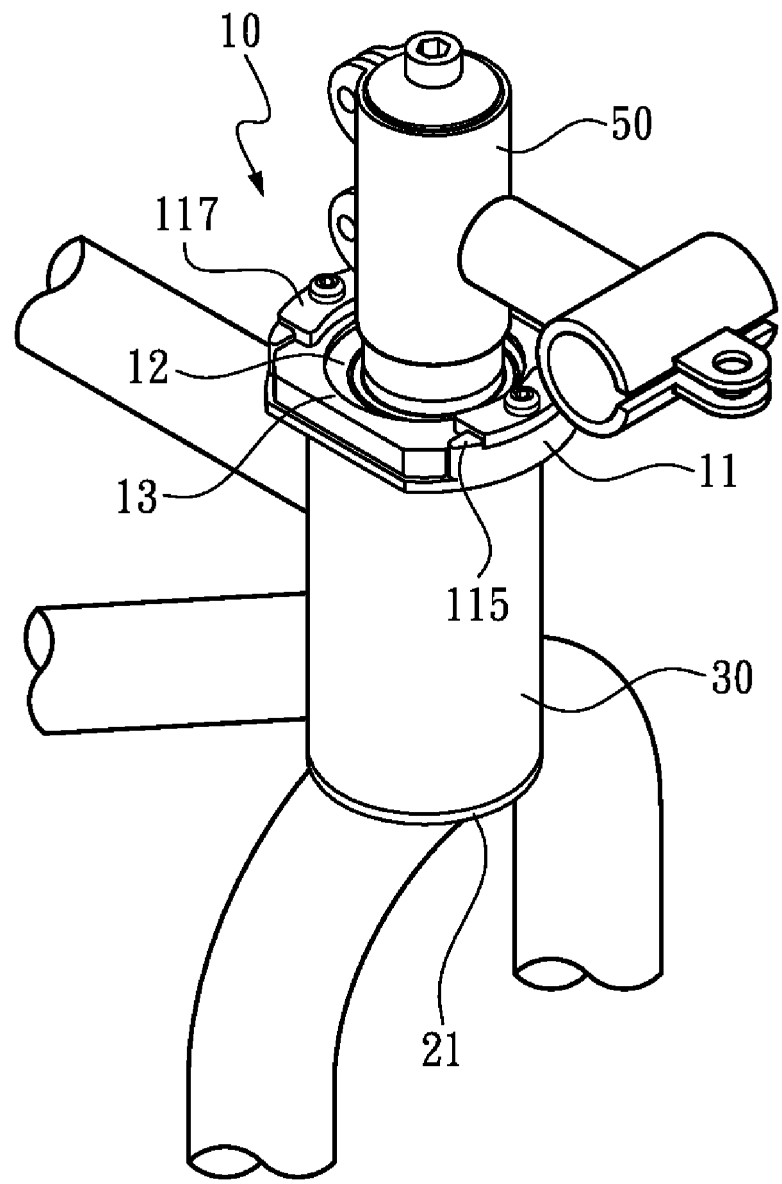
FIG. 2 is an elevational assembly view of set of angle-adjusting head parts for front fork in accordance with the present invention.

Referring to FIGS. 1 and 2, a set of angle-adjusting head parts for front fork in accordance with the present invention is shown comprising a set of upper head parts 10 and a set of lower head parts 20 respectively mounted on the top and bottom ends of a head tube 30 that holds a front fork stem 40 that supports a handlebar stem 50.

The set of upper head parts 10 includes an upper bearing cup 11, an upper bearing 12, an adjusting washer 13, an upper axle bearing 14 and a packing ring 15. The upper bearing cup 11 has an axially extending oval slot 111, which has a major axis and a minor axis, an arched surface 112 located on each of two opposing inside lateral walls thereof in a parallel relationship relative to the major axis of the oval slot 111 and curving inwards, a protruding stop edge 113 located on one end of each of the two arched surfaces 112, a retaining surface 114 defined by each arched surface 112 and the associating protruding stop edge 113, two stop blocks 115 extending along two opposite lateral sides of the minor axis of the oval slot 111, an accommodation chamber 116 defined between the two stop blocks 115, and a locating plate 117 respectively affixed to each of the two stop blocks 115.

The upper bearing 12 is mounted in the upper bearing cup 11, having a top rim 121, and an eccentric slot 122 surrounded by the top rim 121 for the insertion of the front fork stem 40 and reducing gradually downwardly from the top rim and terminating in an eccentric seat 123 that is adapted for engaging into the oval slot 111 of the upper bearing cup 11 to normally stop against the protruding stop edges 113 of the upper bearing cup 11 for the contact of the arched surfaces 112 of the upper bearing cup 11. The upper bearing 12 further has at least one adjustment block 124 protruded from the top wall of the top rim 121.

The upper axle bearing 14 is set in the eccentric slot 122 of the upper bearing 12. The upper axle bearing 14 is an external bearing defining therein an oblique cone surface. The packing ring 15 is set in the upper axle bearing 14 to tighten up the connection between the front fork stem 40 and the upper axle bearing 14.

The adjusting washer 13 is mounted on the upper bearing cup 11 and movable relative to the upper bearing 11 along the minor axis of the oval slot 111, having a circular opening 131 and an annular groove 132 located on the bottom side and extending around the opening 131. The circular opening 131 of the adjusting washer 13 is attached to the upper bearing 12, enabling the top rim 121 of the upper bearing 12 to be rotatably received in the annular groove 132. The adjusting washer 13 is stopped with the two opposite side edges of the top wall thereof against the locating plates 117 at the upper bearing cup 11. The locating plates 117 are respectively affixed to the stop blocks 115 of the upper bearing cup 11 by a respective fastener 118 to hold down the adjusting washer 13 in the accommodation chamber 116 of the upper bearing cup 11.

The set of lower head parts 20 includes a lower bearing cup 21, a lower axle bearing 22 and a lower plug 23. The lower plug 23 is press-fitted into the bottom end of the front fork stem 40. The lower axle bearing 22 is mounted in the lower bearing cup 21. Further, the lower axle bearing 22 is an external bearing defining therein an oblique cone surface.

After understanding of the structural details of the set of angle-adjusting head parts, the operation and principle of the set of angle-adjusting head parts are described hereinafter.

Figure 3:
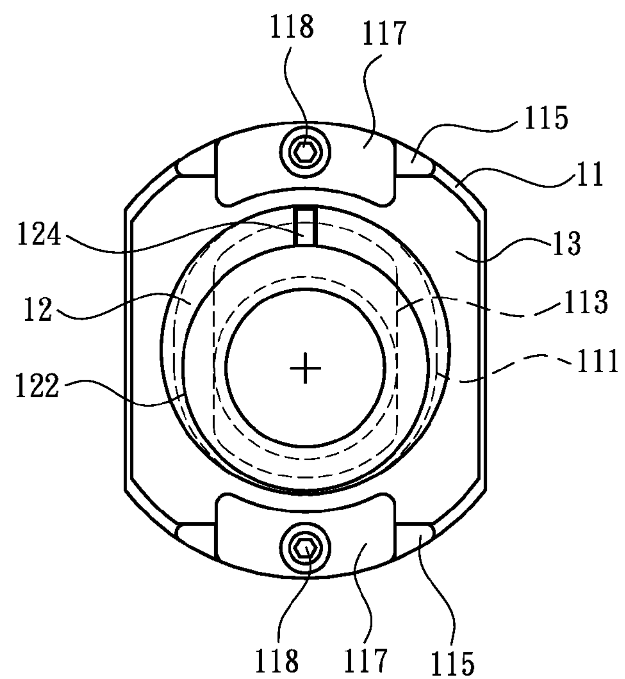
FIG. 3 is a schematic sectional view of the present invention, illustrating an adjustment operation of the set of angle-adjusting head parts (I).
Figure 4:
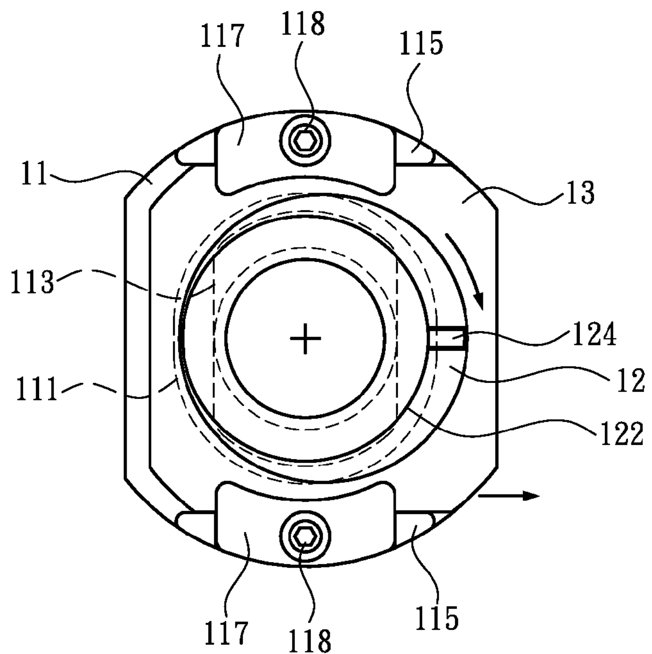
FIG. 4 is a schematic sectional view of the present invention, illustrating an adjustment operation of the set of angle-adjusting head parts (II).

As shown in FIG. 3, when rotating the upper bearing 12 to shift the at least one adjustment block 124 to the front side, the eccentric seat 123 does not touch the arched surfaces 112 of the upper bearing cup 11, and the upper bearing 12 and the adjusting washer 13 are kept in axial alignment with the center of the upper bearing cup 11. At this time, the eccentric slot 122 of the upper bearing 12 is biased backwards relative to the axial center of the upper bearing cup 11. As shown in FIG. 4, when wishing to adjust the angle of the front fork stem 40, loosen the fasteners 118 from the locating plates 117 and the stop blocks 115 of the upper bearing cup 11 and also loosen the fastener at the top end of the handlebar stem 50, and then push the at least one adjustment block 124 with the fingers to rotate the upper bearing 12 rightwards, forcing the eccentric seat 123 into contact with the right-sided arched surface 112 of the upper bearing cup 11 and then synchronously moving the adjusting washer 13 rightwards. Subject to matching between the retaining surface 114 and the eccentric seat 123, displacement of the upper bearing 12 along the minor axis of the oval slot 111 is prohibited during movement of the adjusting washer 13 to correct the position of the axial center of the eccentric slot 122, and therefore the upper bearing 12 can only be moved along the major axis of the oval slot 111 to the axial center of the upper bearing cup 11.

Figure 5:
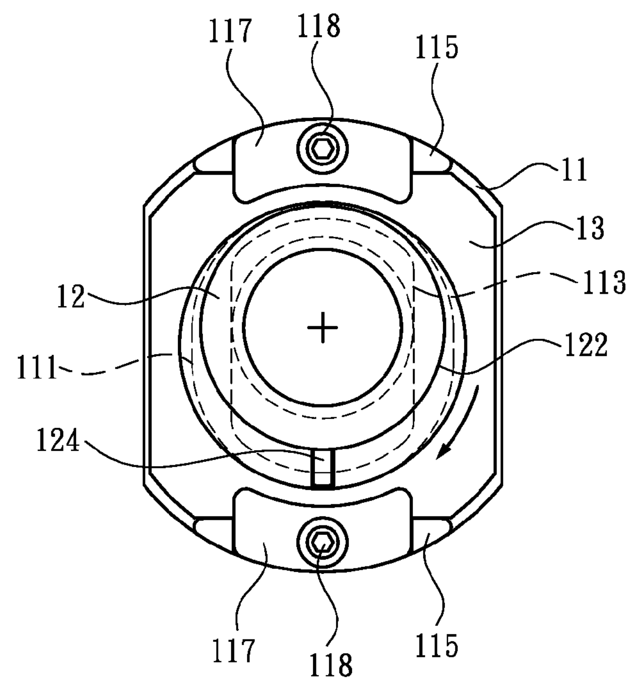
FIG. 5 is a schematic sectional view of the present invention, illustrating an adjustment operation of the set of angle-adjusting head parts (III).
Figure 6:
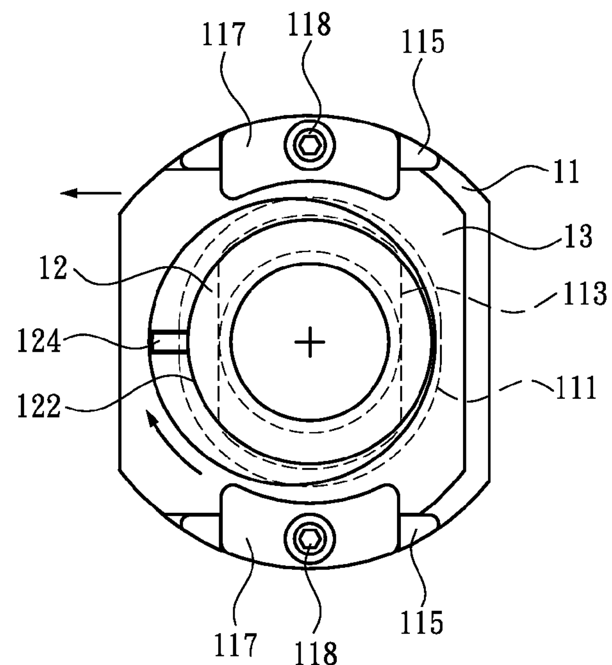
FIG. 6 is a schematic sectional view of the present invention, illustrating an adjustment operation of the set of angle-adjusting head parts (IV).

Referring to FIGS. 5 and 6, when continuously rotating the upper bearing 12, subject to the aforesaid adjustment method, to shift the at least one adjustment block 124 to the back side, the eccentric slot 122 of the upper bearing 12 is returned to the axial center of the upper bearing cup 11. Thus, by means of adjusting the eccentric slot 122 of the upper bearing 12 forwardly or backwardly, the angle of the front fork stem 40 is relatively adjusted.

However, the aforesaid direction of rotation of the upper bearing 12 to cause adjustment of the direction of the eccentric slot 122 is simply to explain the operation and principle of the invention. In actual practice, the direction of adjustment must be done subject to the direction of the arrangement of the eccentric seat 123 and the at least one adjustment block 124.

Figure 7:
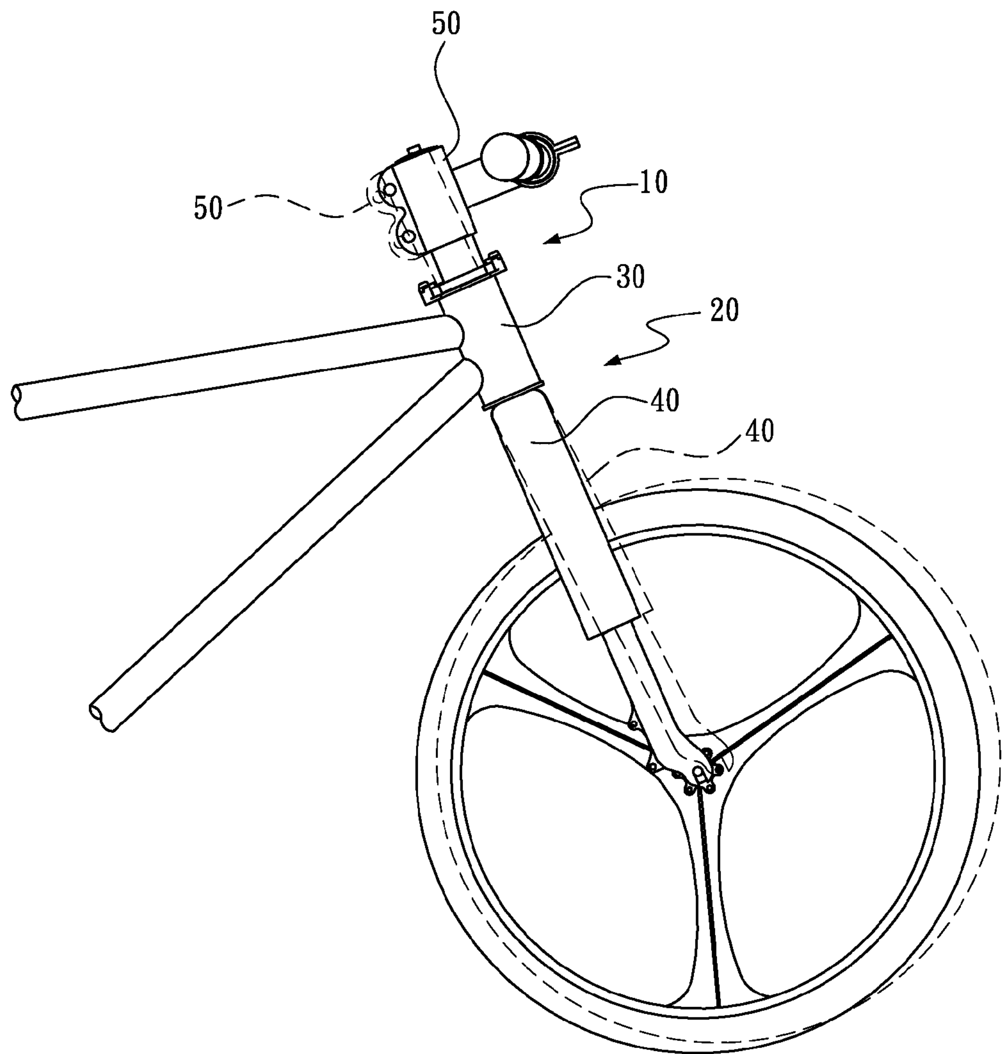
FIG. 7 is a schematic applied view of the present invention, illustrating the set of angle-adjusting head parts installed in a bicycle and the angle of the front fork stem adjusted.

Referring to FIG. 7, the direction of the major axis of the oval slot 111 of the upper bearing cup 11 is same as the direction of the axial center of the body of the frame of the bicycle. Further, the head tube 30 is slightly tilted. When wishing to adjust the wheel span to the maximum status, rotate the upper bearing 12 to shift the at least one adjustment block 124 to the front side (see FIG. 3), biasing the front fork stem 40 along the upper axle bearing 14 and the lower bearing set 22. When adjusting to the desired angle, fasten tight the fastener 118 to affix the locating plates 117 to the stop blocks 115 of the upper bearing cup 11 and to hold down the adjusting washer 13 in the accommodation chamber 116 of the upper bearing cup 11. On the contrary, when wishing to adjust the wheel span to the minimum status, rotate the upper bearing 12 to shift the at least one adjustment block 124 to the back side (see FIG. 5), biasing the front fork stem 40 along the upper axle bearing 14 and the lower bearing set 22 in the reversed direction. Thus, the bicycle rider can adjust the wheel span by means of adjusting the angle of the front fork stem 40, to fit different road conditions and subject to user's individual requirement. Further, because the angle of the head tube 30 is determined subject to the welding position of the front triangle at the head tube 30, a minor welding error causes a change of the angle of the head tube 30. By means of adjusting the angle of the front fork stem 40, the angular error of the head tube 30 can be corrected, assuring the optimal wheel span of the bicycle.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A set of angle-adjusting head parts, comprising a set of upper head parts and a set of lower head parts respectively mounted on top and bottom ends of a bicycle's head tube that holds a front fork stem that supports a handlebar stem, said set of upper head parts comprising:

an upper bearing cup, said upper bearing cup comprising an axially extending oval slot, which has a major axis and a minor axis, an arched surface, and two retaining surfaces respectively located on two opposite inside lateral walls thereof in a parallel manner relative to said major axis of said oval slot;

an upper bearing mounted in said upper bearing cup, said upper bearing comprising a top rim, and an eccentric slot surrounded by said top rim for the insertion of said front fork stem and reducing gradually downwardly from said top rim and terminating in an eccentric seat adapted for engaging into said oval slot of said upper bearing cup for stopping against said retaining surface; and an adjusting washer mounted on said upper bearing cup and movable relative to said upper bearing cup along the minor axis of said oval slot, said adjusting washer having a circular opening defined therein and adapted for attaching to said upper bearing for enabling said upper bearing to be rotatably received in said adjusting washer;

wherein rotating said upper bearing forces said eccentric seat to stop against said retaining surfaces and to further synchronously move said adjusting washer along said major axis of said oval slot, thereby correcting the position of the central axis of said eccentric slot and biasing the angle of said front fork stem.

2. The set of angle-adjusting head parts as claimed in claim 1, wherein said upper bearing cup further comprises two stop blocks extending along two opposite lateral sides of said minor axis of said oval slot, and a receiving chamber defined between said stop blocks; said adjusting washer is slidably accommodated in said receiving chamber.

3. The set of angle-adjusting head parts as claimed in claim 2, wherein said upper bearing cup further comprises two locating plates respectively mounted on said stop blocks, and two fasteners adapted to affix said locating plates to said stop blocks.

4. The set of angle-adjusting head parts as claimed in claim 1, wherein said upper bearing cup further comprises two arched surfaces respectively located on the two opposing inside lateral walls thereof in a parallel relationship relative to said major axis of said oval slot and curving inwards, and two protruding stop edges respectively located on one end of each of said two arched surfaces; said two retaining surfaces are respectively defined by said arched surfaces and said protruding stop edges.

5. The set of angle-adjusting head parts as claimed in claim 1, wherein said upper bearing comprises at least one adjustment block upwardly protruded from said top rim.

6. The set of angle-adjusting head parts as claimed in claim 1, wherein said set of upper head parts further comprises an upper axle bearing mounted in said eccentric slot of said upper bearing; said set of lower head parts further comprises a lower axle bearing mounted in a lower bearing cup thereof at the bottom end of said head tube.

7. The set of angle-adjusting head parts as claimed in claim 6, wherein said upper axle bearing and said lower axle bearing are external bearings respectively defining therein an oblique cone surface.

8. The set of angle-adjusting head parts as claimed in claim 1, wherein said adjusting washer further has an annular groove located on a bottom side thereof and extending around said circular opening adapted for receiving said top rim of said upper bearing for allowing rotation of said upper bearing relative to said adjusting washer.

* * * * *